(12) United States Patent
Johnson et al.

(10) Patent No.: US 7,247,794 B1
(45) Date of Patent: Jul. 24, 2007

(54) DRIP-PROOF SWITCH COVER

(75) Inventors: Timothy M. Johnson, 175 Aberdeen Dr., Algonquin, IL (US) 60102; Frank Annerino, Rolling Meadows, IL (US)

(73) Assignees: Timothy M. Johnson, San Jose, CA (US), part interest; Frank J. Annerino, Palatine, IL (US), part interest; Lloyd L. Zickert, Chicago, IL (US), part interest ( * ) Notice: Subject to any disclaimer, the term of this patent is extended or adjusted under 35 U.S.C. 154(b) by 45 days.

(21) Appl. No.: 11/078,829

(22) Filed: Mar. 11, 2005

(51) Int. Cl.
*H02G 3/14* (2006.01)

(52) U.S. Cl. .......................... 174/66; 174/67; 220/241

(58) Field of Classification Search .................. 174/66, 174/67, 65; 220/241, 242
See application file for complete search history.

(56) References Cited

U.S. PATENT DOCUMENTS

| | | | |
|---|---|---|---|
| 3,953,933 A | | 5/1976 | Goldstein |
| 3,955,870 A | * | 5/1976 | Wasserman ................. 439/144 |
| 4,972,045 A | | 11/1990 | Primeau |
| 5,723,832 A | | 3/1998 | Hall |
| 5,811,729 A | | 9/1998 | Rintz |
| 5,811,730 A | | 9/1998 | Rintz |
| 5,874,693 A | | 2/1999 | Rintz |
| 5,952,634 A | | 9/1999 | Yoshida |
| 5,955,702 A | | 9/1999 | Grossman et al. |
| 5,998,747 A | | 12/1999 | Kelso et al. |
| 6,026,605 A | | 2/2000 | Tippett |
| 6,037,542 A | | 3/2000 | McCall |
| 6,130,384 A | * | 10/2000 | Esteves et al. ................. 174/66 |
| 6,218,616 B1 | | 4/2001 | Bates et al. |
| 6,384,354 B1 | | 5/2002 | Shotey et al. |
| 6,559,380 B2 | | 5/2003 | Soboleski |
| 6,762,662 B2 | | 7/2004 | Lee et al. |

\* cited by examiner

*Primary Examiner*—Dhiru R. Patel
(74) *Attorney, Agent, or Firm*—Lloyd L. Zickert

(57) ABSTRACT

A drip-proof switch cover for covering an electrical box having a wall switch with an actuator protruding through the cover, wherein a collecting reservoir is disposed at the lower end of the cover to collect liquid drippings from the hand of a user during actuation of the switch actuator.

9 Claims, 3 Drawing Sheets

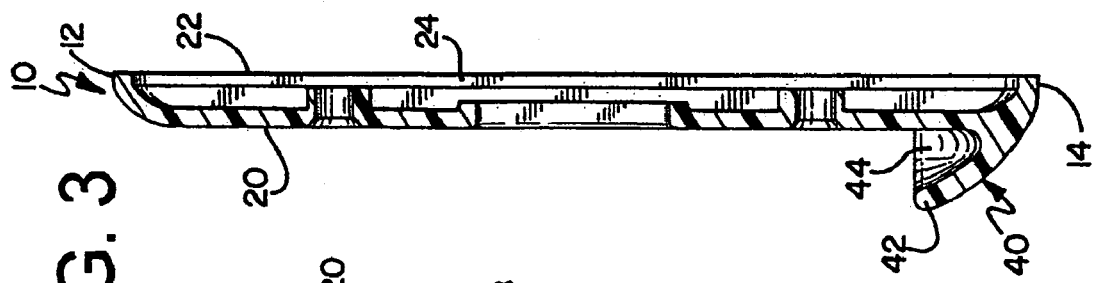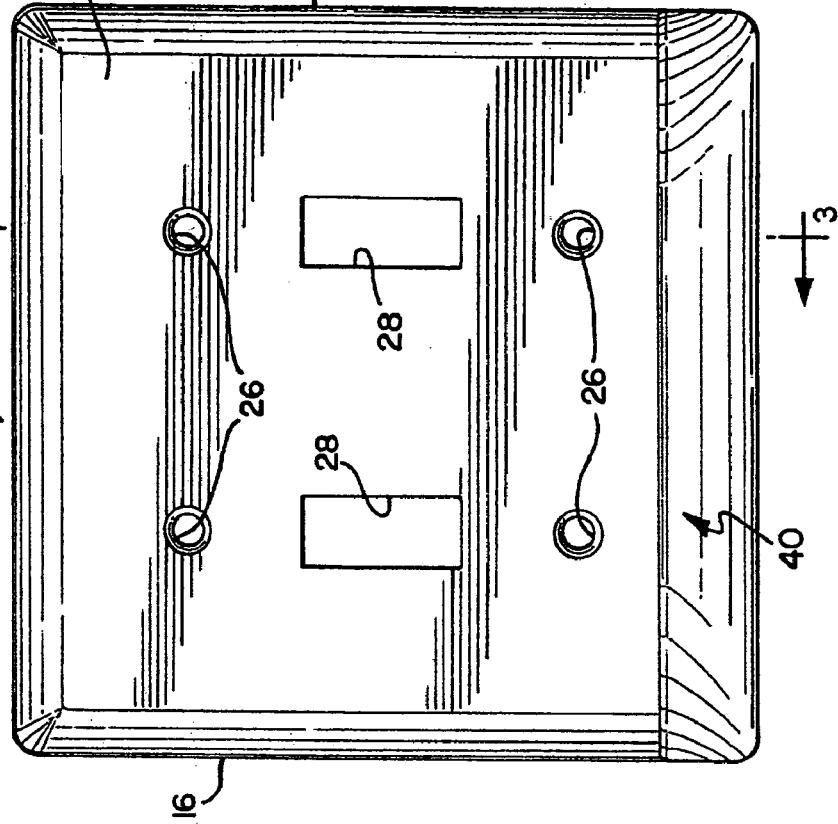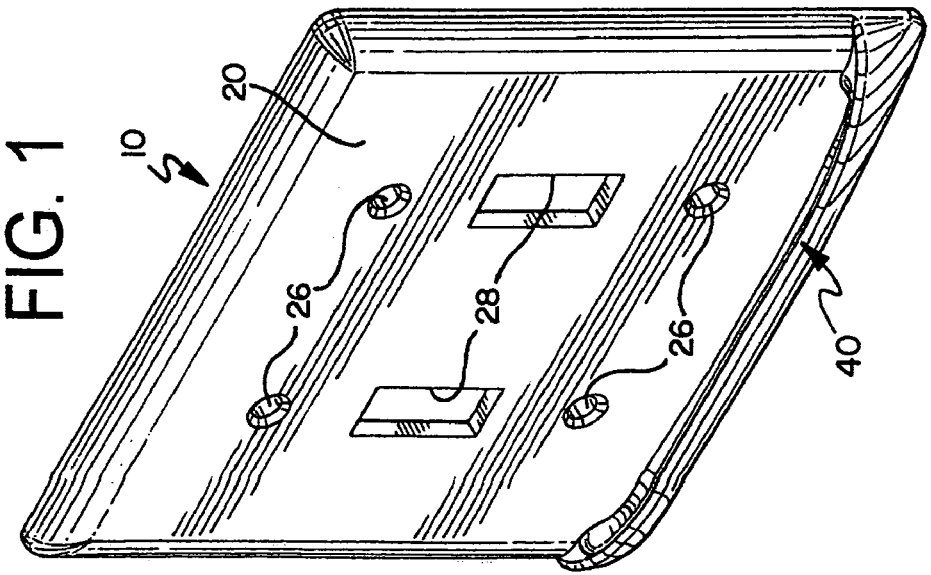

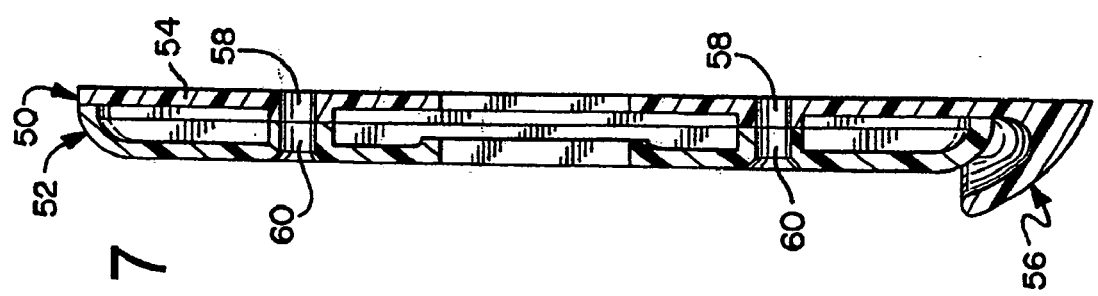
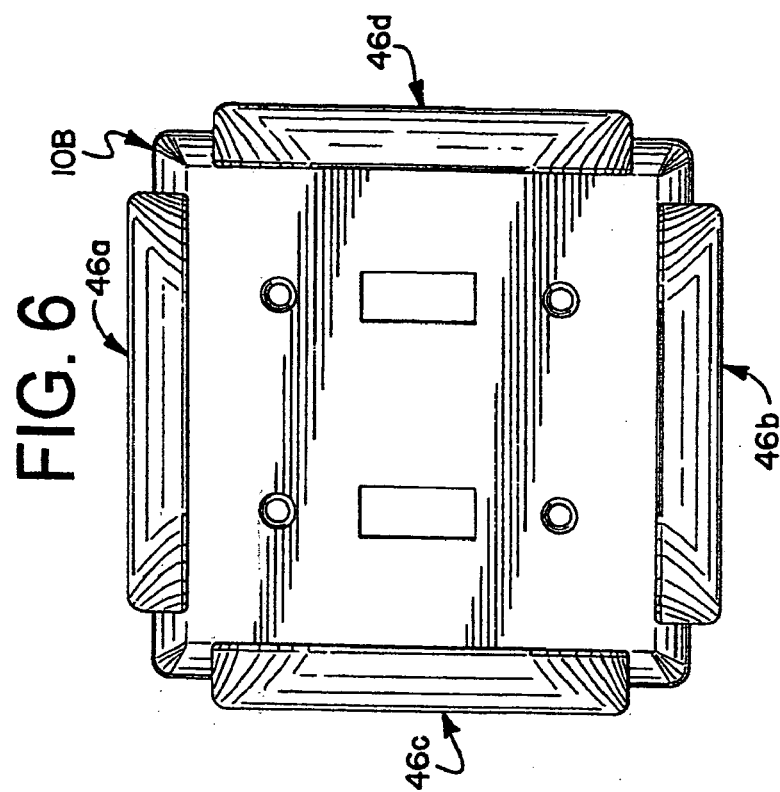
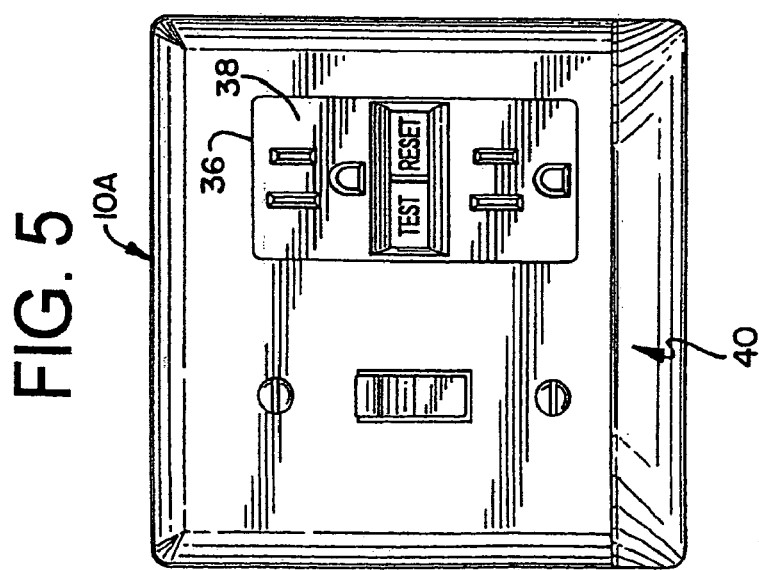

DRIP-PROOF SWITCH COVER

This invention relates in general to a cover plate for an electrical box mounted on or in a wall, wherein the electrical box has mounted therein a switch with an actuator extending through the cover and means is provided at the lower end of the cover to collect drippings from the hand of a user during operation of the actuator, and more particularly to a switch cover having a collecting reservoir at the lower end for collecting drippings coming from the hand of a user during actuation of a switch.

BACKGROUND OF THE INVENTION

Heretofore, it has been well known to provide switch covers of various configurations for covering electrical boxes mounted on or in recessed relation with vertical walls and having switches for controlling lights and/or other devices, such as garbage disposals. Inasmuch as such a switch cover and electrical box is usually mounted adjacent to a sink in which water is encountered in the washing or rinsing of dishes, pots and/or silverware, and the hands of the person washing or rinsing the dishes, pots and/or silverware accumulates water, after which the user might operate a switch for controlling lights, a garbage disposal, or other devices, it has been found that water drips from the hands of the user during the operation of a switch which then can run down the switch cover and the wall on which it is mounted. Such water builds up and causes contamination of the surface of the switch cover as well as the wall below the switch cover sometimes to the extent that not only the switch cover but the wall becomes damaged. For example, sometimes in addition to water, soap scum drips against the cover and the wall which can cause deformation of the cover and the wall which is unsightly, particularly in a kitchen.

Heretofore, no solution has been known to prevent liquid drippings from contaminating walls and the like on which a switch cover is mounted.

SUMMARY OF THE INVENTION

The present invention overcomes the problem above mentioned in providing a switch cover having means for collecting drippings from the hand of a user and preventing the drippings from causing deformation of the switch cover and/or any wall areas below the switch cover as well as preventing discoloration or other damage to the wall in the area of the switch cover.

More particularly, the switch cover of the present invention includes a reservoir or collecting basin at the lower end of the cover for collecting drippings from the hand of a user. Thus, during the operation of an actuator for a switch that operates a light fixture or garbage disposal or other device, drippings from the hand of the user are collected so that they can be easily removed or otherwise disposed of to prevent such drippings from contacting a wall surface or other elements below the switch cover.

It will be appreciated that the drip-proof switch cover of the invention can be used in kitchens or other areas where drippings are encountered in the operation of a switch in order to prevent damage of the switch cover and/or surrounding wall area during operation of a switch associated with the cover. For example, the cover may also be used in bathrooms or laundry rooms where a user might encounter wet hands during the operation of a switch.

It is therefore an object of the present invention to provide a drip-proof switch cover for covering electrical boxes having switches in areas where a user operating the switch may transfer liquid drippings to the cover and/or wall area around the cover.

Another object of the present invention is to provide a switch plate cover having a reservoir at the lower end for purposes of collecting drippings during the operation of a switch at the switch cover location.

A further object of the present invention is to provide a switch cover having an integrally formed reservoir at the lower end of the cover and for collecting liquid drippings.

A still further object of the present invention is to provide an adapter for use with a standard switch cover that includes a reservoir for drippings encountered during operation of a switch.

Another object of the present invention is to provide a switch cover having reservoirs at a plurality of sides so that orientation of the switch cover is not critical to dispose a reservoir at the lower end of the switch for collecting drippings.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 1 is a perspective view of a switch plate cover according to the present invention;

FIG. 2 is a front elevational view of the cover of FIG. 1;

FIG. 3 is a vertical sectional view taken through the switch cover of FIG. 2 and generally along the line 3-3 thereof;

FIG. 5 is a view of a modified switch plate cover according to the invention which not only accommodates a switch actuator but also accommodates electrical outlet sockets;

FIG. 6 is a front elevational view of a further modified switch plate according to the invention which includes reservoirs at each side to allow the switch plate to be oriented in any direction to accommodate different electrical boxes; and FIG. 7 is a vertical sectional view taken through a further modification of the invention that can be used with a standard switch plate and provide a reservoir at the lower end of the switch cover.

DESCRIPTION OF THE INVENTION

Figure 4:
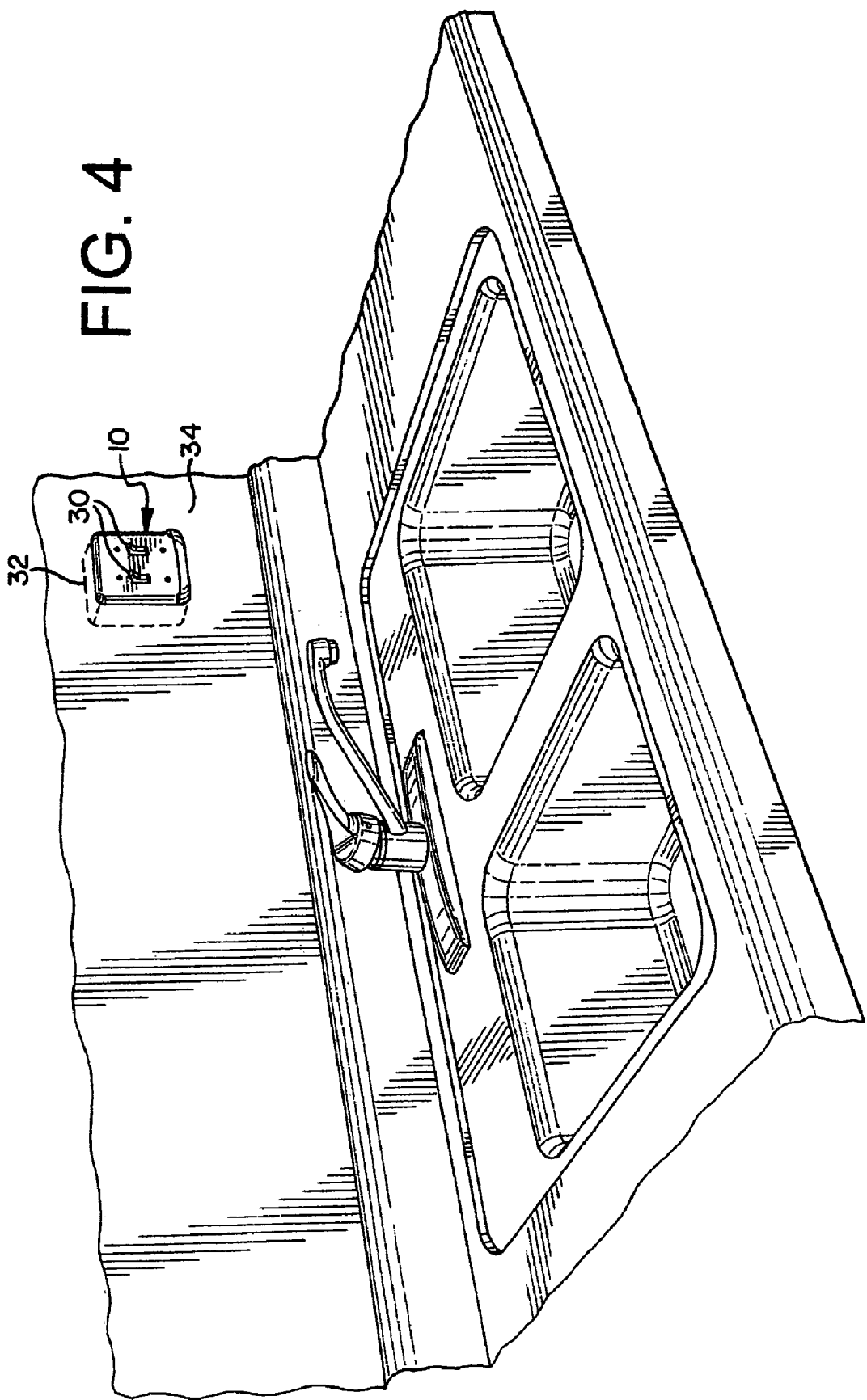
FIG. 4 is a perspective view of a kitchen sink with a switch box and switch cover according to the invention mounted above a splash plate of a sink and showing two switch actuators protruding from the switch plate and an electrical box in dotted lines as being recessed in the wall.

Referring now to the drawings, and particularly to FIGS. 1 to 3, a switch cover, generally designated by the numeral 10, includes top and bottom ends 12 and 14, opposed sides 16 and 18, a front face 20, and a backside 22. At the backside a peripheral rib 24 serves to engage the wall on which the switch plate would be mounted, wherein the switch cover would protrude slightly from the wall.

The switch cover includes a plurality of holes 26 to accommodate fastening screws to fasten the switch cover to a switch in an electrical box mounted on or in recessed relation to a wall. Normally, switch boxes are mounted in recessed relation to a wall, wherein the rim or rib 12 of the cover would engage the wall. However, it should be appreciated that the drip-proof cover of the invention could also be used on electrical boxes that are mounted onto a wall.

The cover 10 includes a pair of switch actuator openings 28 through which switch actuators of a switch protrude when the cover is mounted on an electrical box, as particularly seen in FIG. 4, where switch actuators 30 extend within the openings 28 and protrude from the front face of the cover plate for engagement and actuation by a user. Also shown in FIG. 4 in dotted lines is an electrical box 32 recessed within the wall 34 and which is covered by the switch cover 10.

While the switch cover 10 shows a pair of switch actuator openings, it should be appreciated that the present invention will be applicable to switch covers having a single switch actuator opening or a multiple of openings greater than two. Additionally, as shown in the switch cover 10A in FIG. 5, a single switch actuator opening may be provided together with an opening 36 for a pair of electrical outlets 38.

The drip-proof cover 10 of the invention includes a reservoir 40 disposed at the lower end 14 of the cover and protruding from the front face 20. This reservoir is in the form of a trough, as particularly seen in FIGS. 1 and 3, for collecting liquid drippings that may fall from the hand of a user operating a switch at the switch cover. The reservoir 40 includes an outwardly and upwardly projecting wall 42 coacting with the front face of the cover to define a trough 44 capable of collecting liquid drippings. The reservoir 40 is integrally molded with the cover and which would preferably be of a suitable plastic. However, it should be appreciated that the switch cover could be made of any other suitable material, including metal, ceramic or wood, and it could be of any suitable configuration.

Accordingly, the switch cover 10 includes the reservoir 40 at the lower end of the switch cover for collecting liquid drippings and preventing them from running onto the wall or splash plate of a counter to protect the wall and splash plate against moisture damage.

While the switch cover 10 is rectangular in shape and actually square, it could be of any suitable shape, and the reservoir could likewise take any other shape and always be at the lower end of the cover catching liquid drippings.

It will be appreciated that some electrical boxes include switches having toggle actuators that are operated by movements along a horizontal plane instead of a vertical plane and in which case the rectangularly shaped switch actuator openings will extend horizontally, instead of vertically as shown in the embodiments of FIGS. 1 to 3. Therefore, it will be appreciated that the reservoir may be placed along another side of the switch cover and to illustrate the various positions of a reservoir the embodiment of FIG. 6, generally designated by the numeral 10B, shows a cover having reservoirs at all four sides of the cover. The reservoirs are designated by the numerals 46a, 46b, 46c, and 46d. Reservoirs 46a and 46b are at the top and bottom ends of the switch cover, while reservoirs 46c and 46d are at the opposite sides of the switch cover. While the reservoirs do not extend completely across the edges of the cover, it will be appreciated that they could so extend the entire length of the sides if desired. Further, it will be appreciated that in this embodiment the reservoirs would be integrally molded with the cover plate and it would not matter what orientation the cover is placed on the wall. One reservoir would always be at the bottom of the switch cover for collecting liquid drippings.

Another embodiment of the invention is shown in FIG. 7, wherein an adapter 50 is provided to coact with a standard switch plate cover 52 in order to convert the standard cover to a drip-proof cover. In this embodiment the switch cover 52 would be of the conventional type but would be modified with the adapter 50 to make it drip-proof. The adapter 50 includes a mounting member 54 and a reservoir 56. The mounting member 54 would be suitably sized and shaped to fit behind the cover plate 52 in order to support the reservoir 56. It will be appreciated that the mounting member 54 would be peripherally formed to mate with the periphery of the switch cover except at the lower end where the reservoir 56 is located. Additionally, the mounting member would include holes 58 that would be aligned with and match the screw holes 60 of the cover plate 52, so that screws would not only go through and support the switch cover but also the reservoir mounting member 54. Additionally, it would be appreciated that the mounting member would have openings to accommodate the switch actuators. The mounting member 56 may take any suitable form or any suitable size for purposes of mounting the reservoir 56 at the lower end of the switch cover and converting a standard switch cover to a drip-proof switch cover according to the invention.

In any of the embodiments above described, it will be appreciated that the amount of liquid drippings collected will be small and the reservoirs can be easily cleaned when necessary.

It will be understood that modifications and variations may be effected without departing from the scope of the novel concepts of the present invention, but it is understood that this application is to be limited only by the scope of the appended claims.

The invention claimed is:

1. A drip-proof switch cover for covering an electrical box mounted on or in a substantially vertical wall adjacent to a sink, wherein said electrical box includes at least one wall switch having an actuator, said switch cover comprising:
   a plate sized to cover said electrical box,
   said plate having top and bottom ends and a front face,
   at least one opening in the plate through which the actuator of the wall switch can protrude for access to a user for actuating the wall switch,
   and means disposed below said wall switch and directly at the bottom end of said plate which extends substantially thereacross for collecting liquid drippings from a hand of a person during the actuation of the wall switch actuator,
   said means including a projecting wall integrally formed with the cover,
   whereby said drippings are collected by said means and prevented from running down the wall below the cover.

2. The drip-proof switch cover of claim 1, wherein said means is a reservoir for collecting said drippings.

3. The drip-proof switch cover of claim 1, wherein said means comprises a base mounted between at least a part of the cover and the wall having means at the lower end thereof extending directly under and outward from the front face of the cover to catch any drippings from a person's hand actuating the wall switch actuator.

4. The drip-proof switch cover of claim 1, wherein said cover includes a plurality of openings for a plurality of switch actuators.

5. The drip-proof switch cover of claim 1, wherein said cover further includes an opening for an outlet.

6. The drip-proof switch cover of claim 1, wherein said cover is rectangular and includes means at all sides for collecting drippings whereby the cover may be oriented with any side down and still collect drippings.

7. An adapter in combination with a switch cover for covering an electrical box on or recessed in a substantially vertical wall adjacent to a sink, and said cover having at least one switch with an actuator, wherein the adapter collects liquid drippings from the hand of a person operating the actuator, and said cover includes an upper end, a lower end, and at least one opening through which the actuator protrudes, said adapter having means coacting with the cover for mounting the adapter, and said coacting means disposed at said bottom end of the cover including a projecting wall integrally formed with said coacting means and extending at least below the actuator for collecting drippings from the hand of a person operating said actuator.

8. The adapter of claim 7, wherein said means disposed below the front face of the cover includes a reservoir for collecting said drippings.

9. A drip-proof switch cover for covering an electrical box mounted on or in a substantially vertical wall adjacent to a sink, wherein said electrical box includes at least one wall switch having an actuator, said switch cover comprising:

a plate sized to cover said electrical box, said plate having top and bottom ends and a front face, at least one opening in the plate through which the actuator of the wall switch can protrude through the front face for access to a user for actuating the wall switch, means integral with the cover including a reservoir, and said reservoir extending thereacross; directly along the bottom end of said plate and disposed below said wall switch for collecting liquid drippings from the hand of a person actuating the actuator, whereby the collection of the drippings prevents the drippings from running down the wall.

* * * * *